United States Patent
Qin et al.

(10) Patent No.: US 8,455,129 B2
(45) Date of Patent: Jun. 4, 2013

(54) FIXING APPARATUS FOR FIXING BATTERY

(75) Inventors: Jun-Jie Qin, Shenzhen (CN); Yong-Hui Hu, Shenzhen (CN); Kai-Kuei Wu, Taipei Hsien (TW); Kun-Chih Hsieh, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 394 days.

(21) Appl. No.: 12/888,324

(22) Filed: Sep. 22, 2010

(65) Prior Publication Data

US 2012/0045676 A1    Feb. 23, 2012

(30) Foreign Application Priority Data

Aug. 17, 2010 (CN) .......................... 2010 1 0255532

(51) Int. Cl.
*H01M 2/10* (2006.01)
*H05K 7/06* (2006.01)

(52) U.S. Cl.
USPC .............................. 429/100; 429/96; 361/760

(58) Field of Classification Search
None
See application file for complete search history.

(56) References Cited

U.S. PATENT DOCUMENTS

| 4,653,822 | A  | * | 3/1987  | Kanazawa ............... 439/68 |
| 8,091,224 | B2 | * | 1/2012  | Slaton et al. ............ 29/857 |
| 2001/0044281 | A1 | * | 11/2001 | Peterzell et al. ........... 455/90 |

* cited by examiner

*Primary Examiner* — Jonathan Crepeau
(74) *Attorney, Agent, or Firm* — Altis Law Group, Inc.

(57) ABSTRACT

A fixing apparatus for fixing a battery in an electronic device is provided. The fixing apparatus includes a circuit board, a support frame, and a cover. The circuit board defines an opening therein. The support frame is received in the opening and is configured for receiving the battery. The cover defines at least one pair of latching members therein. Wherein the at least one pair of latching member latches onto the circuit board to fix the battery between the support frame and the cover.

10 Claims, 3 Drawing Sheets

FIXING APPARATUS FOR FIXING BATTERY

BACKGROUND

1. Technical Field

The present disclosure relates to battery fixing apparatuses and, particularly, to a fixing apparatus for fixing a battery in an electronic device.

2. Description of the Related Art

Commonly, the bigger a battery is, the longer the battery will last to power an electronic device, but a big battery built into an electronic device will greatly increase the size of the portable electronic device, which is against the trend of electronic device manufacturers trying to further reduce the size of portable electronic devices.

Therefore, what is needed is a fixing apparatus applied in an electronic device to overcome the above-mentioned shortcomings.

BRIEF DESCRIPTION OF THE DRAWINGS

The components in the drawings are not necessarily drawn to scale, the emphasis instead being placed upon clearly illustrating the principles of fixing apparatus for fixing a battery. Moreover, in the drawings, like reference numerals designate corresponding parts throughout the several views.

DETAILED DESCRIPTION

Figure 1:
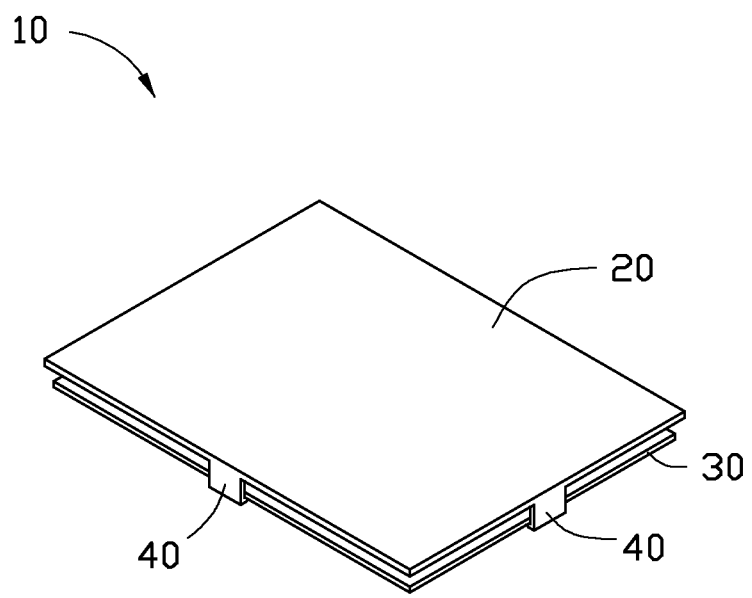
FIG. 1 is a perspective view of a fixing apparatus for fixing a battery in an electronic device in accordance with an exemplary embodiment.
Figure 2:
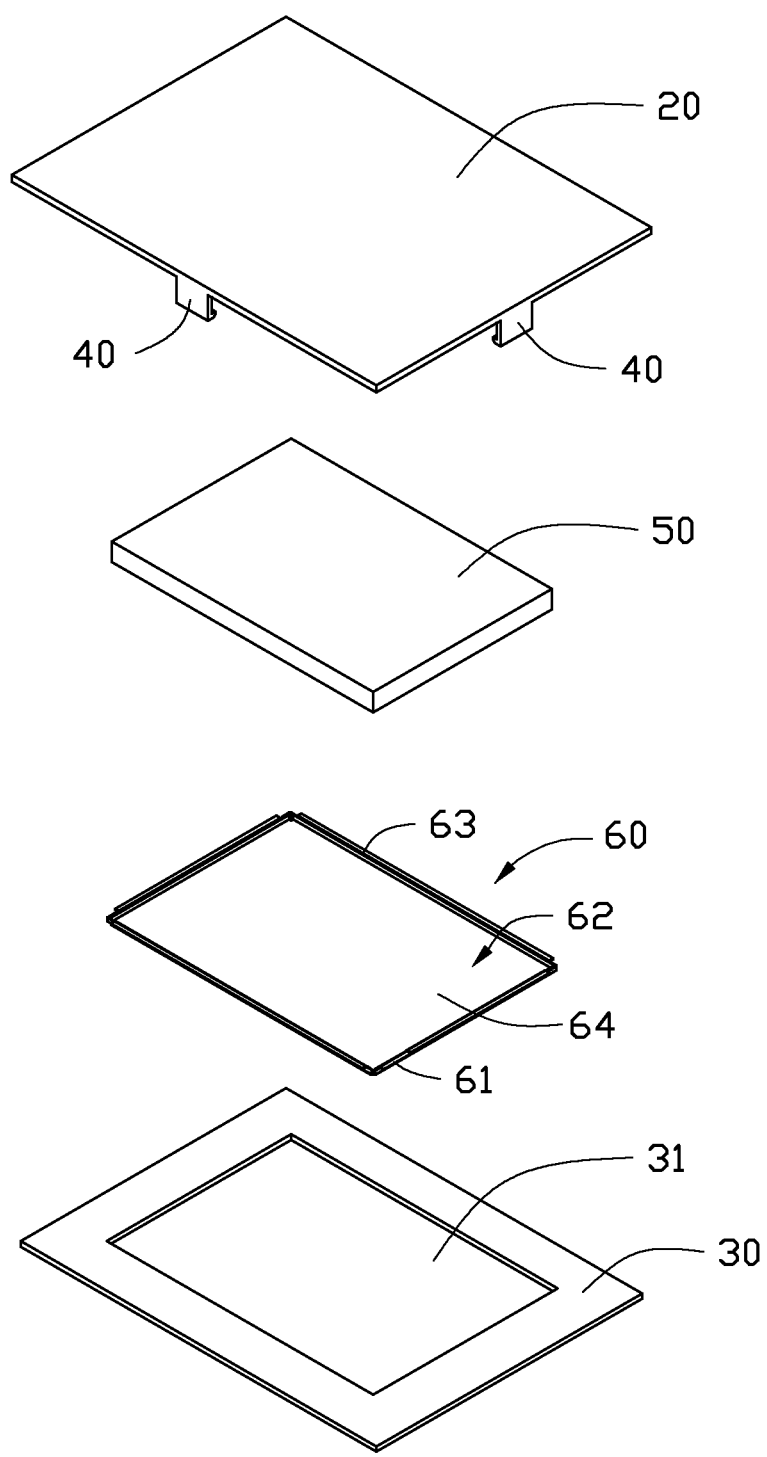
FIG. 2 is an exploded perspective view of the fixing apparatus of FIG. 1.

Referring to FIGS. 1 and 2, a fixing apparatus 10 for fixing a battery 50 includes a circuit board 30, a support frame 60, and a cover 20. In the exemplary embodiment, the apparatus 10 is for being employed in an electronic device, such as a notebook computer, a mobile phone, an e-reader, a PDA, or the like.

An opening 31 is defined in the circuit board 30 for receiving the support frame 60. Latching members 40 are defined in the cover 20 for latching the circuit board 30 in place, and to fix the battery 50 between the support frame 60 and the cover 20. In the exemplary embodiment, the latching members 40 are integrally formed with the cover 20. In an alternative embodiment, the latching members 40 are made of elastic metal material and fixed on the cover 20.

A receiving space 62 is defined in the support frame 60 and surrounded by sidewalls 61 vertically protruding from the edges of the support frame 60. Therefore, a part of the battery 50 is received in the receiving space 62 when the battery 50 is fixed in the fixing apparatus 10. One stop plate 63 is formed on the sidewalls 61 and is parallel to the bottom plate of the support frame 60. When the support frame 60 is received in the opening 31, the stop plate 63 is hung on the interior edges of the circuit board 30, namely the edges surrounding the opening 31. In the exemplary embodiment, the support frame 60 includes a bottom plate 64. The support frame 60 is made of metal to prevent electromagnetic interference escaping from the circuit board 30, and the thickness of the bottom plate 64 of the support frame 60 does not exceed 0.2 mm, and is less than the thickness of the circuit board 30. The sidewalls 61 and the stop plate 63 may be adhered onto the interior edges of the circuit board 30 with paste.

Figure 3:
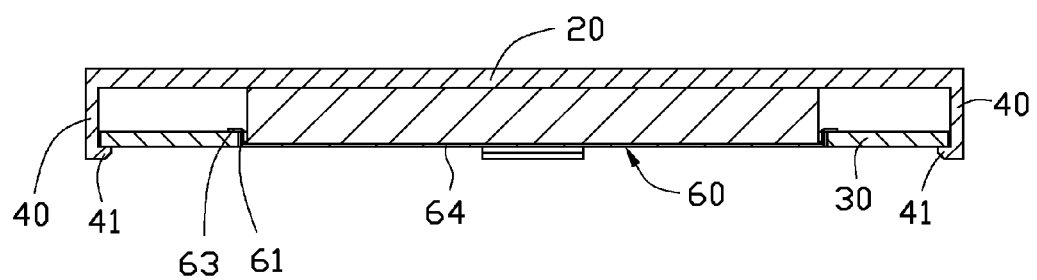
FIG. 3 is a cross-sectional view of the fixing apparatus of the FIG. 1.

Further referring to FIG. 3, an incline 41 is formed on the end of each of the latching members 40, and configured to easily latch onto the exterior edge of the circuit board 30. In the exemplary embodiment, the latching members 40 latch onto the exterior edge of the circuit board 30 to lock the cover 20 on the circuit board 30. In an alternative embodiment, a plurality of through holes (not shown) are defined in the circuit board 30, and the latching members 40 latch in the through holes to hold the circuit board 30.

To install the battery 50 in the fixing apparatus 10, firstly, put the battery 50 into the receiving space 62 of the support frame 60 after the cover 20 is opened. Then, push the cover 20 to drive the latching members 40 to latch onto the exterior edge of the circuit board 30, fixing the battery 50 between the support frame 60 and the cover 20.

By using the battery fixing apparatus 10, the opening 31 defined in the circuit board 30 receives a part of the battery 50 within the support frame 60, which cuts down on the amount of space needed to accommodate the battery 50. Therefore, thickness of the electronic device can be reduced; and both the support frame 60 and the battery 50 are combined with the circuit board 30 to form a single unit, which increases the rigidity of the circuit board 30.

It is understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A fixing apparatus for fixing a battery in an electronic device, comprising:
   a circuit board defining an opening therein;
   a support frame received in the opening and configured for receiving the battery; and
   a cover defining at least one pair of latching members therein;
   wherein the at least one pair of latching members latch on the circuit board to fix the battery between the support frame and the cover.

2. The fixing apparatus as claimed in claim 1, wherein a receiving space is defined in the support frame and surrounded by sidewalls vertically protruding from the edges of the support frame.

3. The fixing apparatus as claimed in claim 2, wherein at least one stop plate is formed on one of the sidewalls and parallel to the support frame; the at least one stop plate is hung on the interior edges of the circuit board when the support frame is received in the opening.

4. The fixing apparatus as claimed in claim 1, wherein the at least one pair of latching members are integrally formed with the cover.

5. The fixing apparatus as claimed in claim 1, wherein the latching members are made of elastic metal material and fixed on the cover.

6. The fixing apparatus as claimed in claim 1, wherein the support frame is made of metal.

7. The fixing apparatus as claimed in claim 1, wherein the support frame comprises a bottom plate, the thickness of the bottom plate of the support frame does not exceed 0.2 mm.

8. The fixing apparatus as claimed in claim 1, wherein an incline is formed on the end of each of the latching members.

9. The fixing apparatus as claimed in claim 1, wherein the latching members latch the exterior edge of the circuit board to lock the cover on the circuit board.

10. The fixing apparatus as claimed in claim 1, wherein the support frame comprises a bottom plate, the thickness of the bottom plate of the support frame is less than the thickness of the circuit board.

* * * * *